Figure 1:
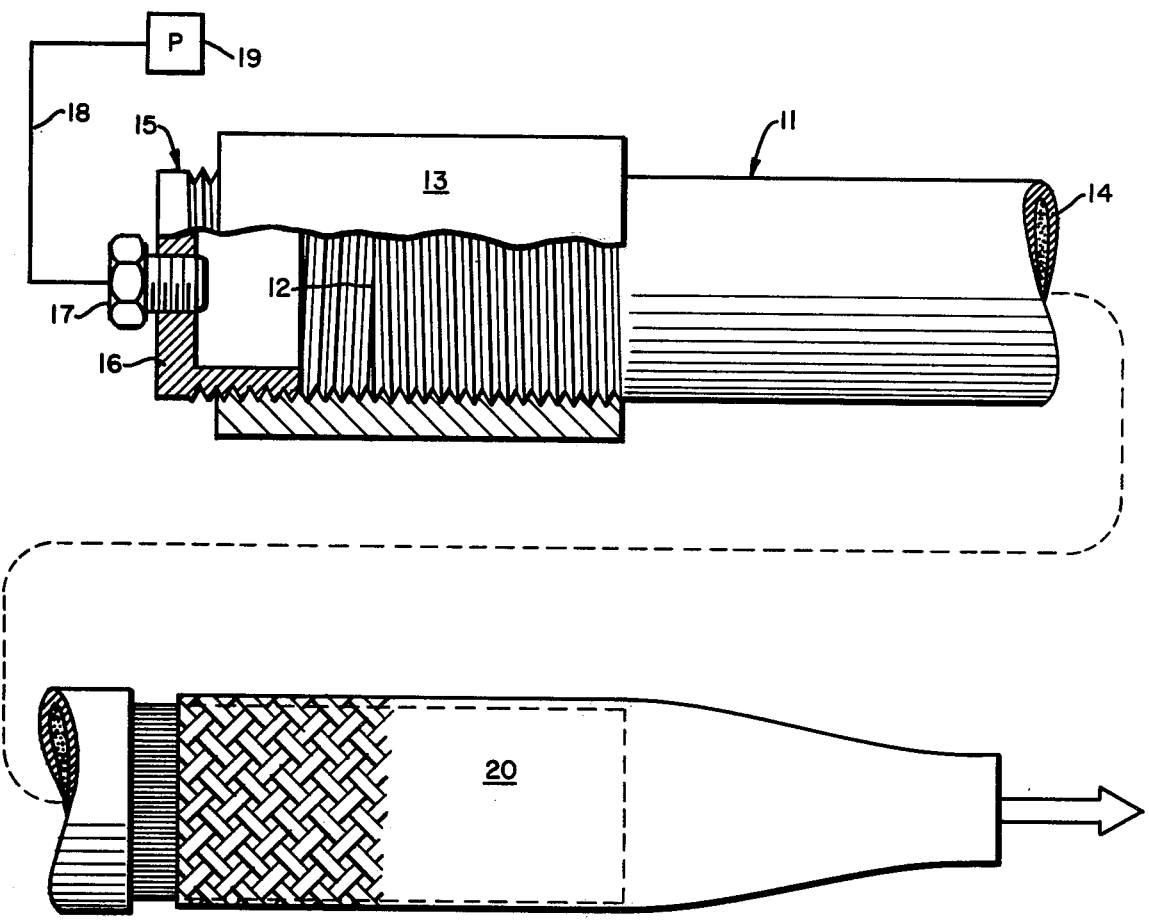

United States Patent [19]

Conti et al.

[11] 4,197,628
[45] Apr. 15, 1980

[54] METHOD FOR REMOVING CONDUCTORS FROM THE SHEATHING OF A CABLE

[76] Inventors: Allen C. Conti, 5294 E. 117th St., Garfield Heights, Ohio 44125; Armand R. Conti, 3464 N. Wendover Cir., Youngstown, Ohio 44511

[21] Appl. No.: 965,127

[22] Filed: Nov. 30, 1978

[51] Int. Cl.$^2$ ............................ F16L 1/00; H02G 1/12
[52] U.S. Cl. ..................................... 29/426.5; 29/234; 81/9.51
[58] Field of Search .................. 29/427, 234, 235, 403; 81/9.51, 9.5 R

[56] References Cited

U.S. PATENT DOCUMENTS

| 2,983,366 | 5/1961 | Perret | 29/234 X |
| 4,018,058 | 4/1977 | Eichenseher et al. | 81/9.51 X |

Primary Examiner—Milton S. Mehr
Attorney, Agent, or Firm—Thomas H. Murray; Clifford A. Poff

[57] ABSTRACT

Conductors are removed from the sheathing of a cable by attaching a sleeve to the outer surface at one end of the sheathing of a selected length of cable. When the sheathing is made of lead, the sleeve has internal threads that are passed onto the sheathing. Alternative measures for attaching the sleeve to the sheathing include forming a bonded film of solder or cured adhesive. The free end of the sleeve is joined with a fitting coupled by a conduit to a source of lubricant under pressure. Lubricant is forced through the sleeve into the sheathing under sufficient pressure to cause the lubricant to flow along the conductors of the cable. After the lubricant disperses within the sheathing, the conductors are withdrawn. When the cable is buried, anchoring of the sheathing is usually unnecessary. When anchoring is necessary, a T-shaped anchor is attached by threads to the sleeve and a rope is used to attach the anchor to a support surface.

10 Claims, 2 Drawing Figures

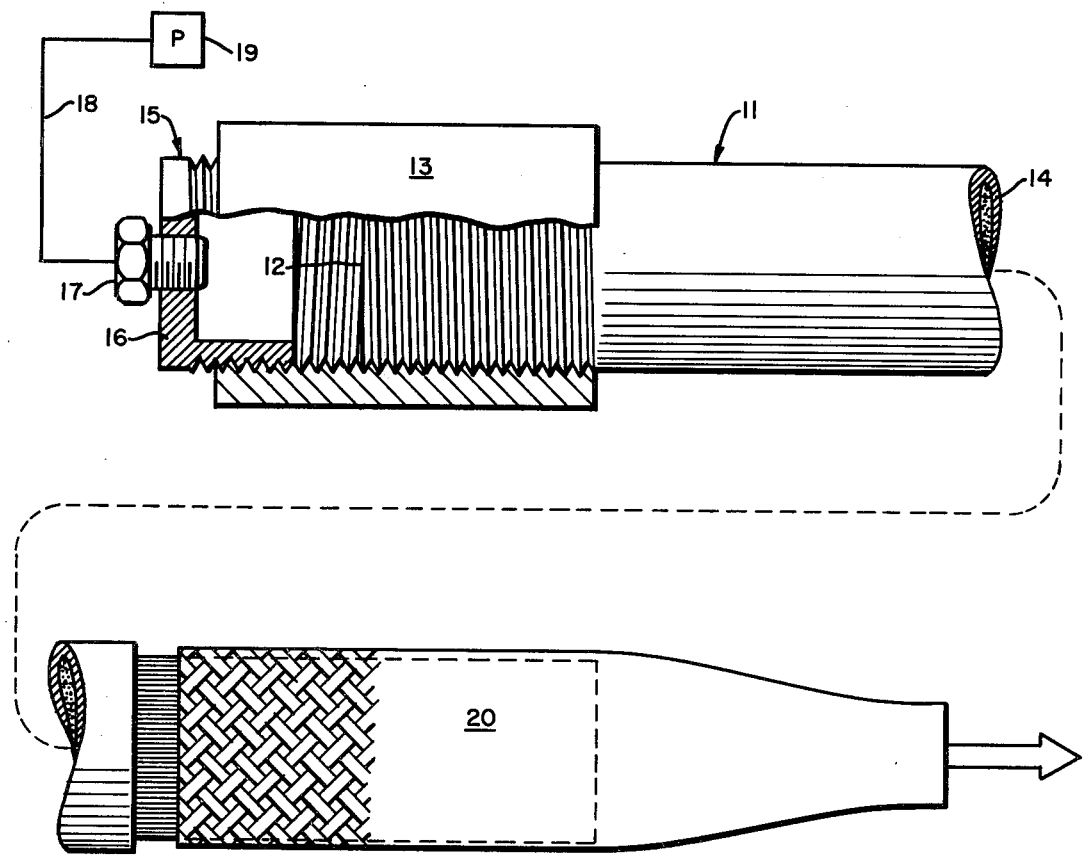

METHOD FOR REMOVING CONDUCTORS FROM THE SHEATHING OF A CABLE

BACKGROUND OF THE INVENTION

This invention relates to a method for reclaiming, salvaging and even reusing cable and/or its parts while buried, located in underground ducts or aerially supported aboveground. More particularly, the present invention relates to a method for introducing a lubricant into the sheathing of a cable to provide a film of lubricant between the sheathing and the conductors for removal of the conductors by applying tension thereto relative to the sheathing.

It is necessary or desirable to remove conductors from the sheathing of a cable because of various different reasons. Sometimes it is desirable to salvage the conductor metals which usually consist of copper or aluminum. The conductors may break, i.e., suffer a loss of continuity, which necessitates corrective measures that can be undertaken by replacing the damaged conductors without the need to replace the entire cable. In this regard, the present invention contemplates removal of the conductors while the sheathing remains in situ for reintroduction of replacement conductors for transmission purposes while eliminating the time and expense required to replace an entire length of cable. Moreover, the replacement conductors may embody improved technology such as optical fibers and the like. A coaxial cable, power cable and air pipe can be reintroduced into a sheathing from which conductors have been removed.

SUMMARY OF THE INVENTION

It is an object of the present invention to provide a method for removing conductors from the sheathing of cable by establishing a film of lubricant between the conductors and the sheathing to enable withdrawal of the conductors by the application of tension thereto.

It is a further object of the present invention to provide a method of reclaiming, salvaging and/or reusing damaged, abandoned or discarded cable while buried, located within an underground duct, aerially supported or located at a storage area wherein conductors from such cable are removed to permit, if desired, reuse of the duct formed by the sheathing of the cable.

More particularly, according to the present invention, there is provided a method for removing conductors from the sheathing of cable comprising the steps of selecting a desired length of cable having conductors extending along a length of sheathing, attaching a sleeve to the outer surface of the sheathing at one end thereof, introducing a lubricant through one end of the sleeve into the sheathing under sufficient pressure to cause the lubricant to flow along the conductors of the cable, thereafter allowing the lubricant to disperse within the sheathing to form a film of lubricant between the sheathing and the conductors, and withdrawing the conductors from the sheathing by applying a force to one end of the conductors.

In its preferred form, the method of the present invention is further characterized by using the sleeve attached to one end of the sheathing to anchor the sheathing against longitudinal movement while withdrawing the conductors therefrom. Such anchoring is effected by removing a fitting used to deliver a lubricant into the sleeve and attaching a T-shaped anchor member. Threads are suitable for attachment of the sleeve to the outer surface of the sheathing. However, if desired, after cleaning the exterior surface of the sheathing along a portion at one end thereof, a bonding film, such as solder or cured adhesive, may be employed to retain the sleeve on the outer surface of the sheathing. A gripping device, such as woven netting, is attached to one exposed end of the conductors to transmit tension thereto for removing the conductors from the sheathing.

Figure 2:
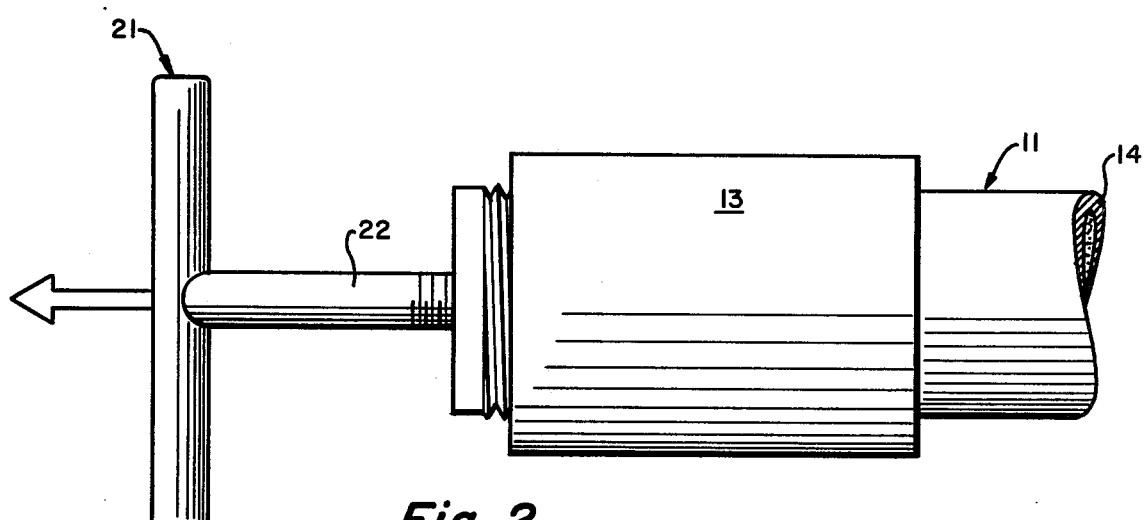

These features and advantages of the present invention as well as others will be more fully understood when the following description is read in light of the accompanying drawing, in which:

FIG. 1 illustrates the arrangement of parts to introduce a lubricant into the sheathing of a cable for carrying out the method of the present invention; and FIG. 2 illustrates one form of an anchor which is suitable to carry out the method of the present invention.

In the method of the present invention, old, used, discarded, abandoned, or damaged cable whether buried, extending within underground ductwork, in a storage area or arranged aerially can be reclaimed, salvaged and reused according to the method of the present invention. Telephone cable and electric utility cable are typical, well-known forms of cable comprised of conduits protected by an outer sheathing. A soldered connection is preferably formed when a length of cable is located in an area where safe use of an open flame is possible. In the initial step of the method of the present invention, a length of cable is selected which is usually between about 175 and 550 feet long, typically 250 feet long, for the removal of conductors from the sheathing thereof. However, it is within the scope of the present invention to remove conductors from a cable which is less than 50 feet in length. It is to be understood that the length of cable which is selected may be determined by other factors such as by the fact that a cable extends transversely beneath the expressway whereby the length is determined by the width of the expressway because it is economicaly desirable to avoid the need to unearth any part of the cable beneath the paved portion of the expressway.

When a cable has a sheathing formed of lead and conductors in bundle formation, both ends of the cable must be exposed for access thereto. In FIG. 1, one end of a selected cable 11 is prepared by cleaning foreign materials from about the final 5 to 7 inches of the outer surface of the sheathing. The end 12 of the cable should extend perpendicular to the longitudinal axis of the cable which can be readily achieved by performing a fresh saw cut. Solder flux is applied to the cleaned end of the sheathing about the outer circumference thereof and to the inside surface of a sleeve 13. The sleeve preferably has a threaded internal surface for self-tapping threaded engagement with the external surface of the sheathing which is identified in FIG. 1 by reference numeral 14. The sleeve 13 is then threaded onto the cleaned end portion of the sheathing into at least one-half of the length of the sleeve. The sleeve is then heated and a supply of solder, when needed, is provided to form a bonded film between the collar and the sheathing. It is to be understood, of course, that the sleeve is made from suitable materials such as copper or brass to permit the formation of a bonded film of solder between the sleeve and the lead sheathing. The end of a cable and the sleeve is then cooled to ambient temperature.

An end cap fitting 15 is threadedly attached to the exposed end of the sleeve 13. The fitting 15 has external threads to mate with the internal threads of the sleeve. The end cap fitting 15 includes an end wall 16 having a threaded opening to receive a fitting 17 that is, in turn, coupled to a flexible conduit 18 to deliver a lubricant from the discharge opening of a suitable pump 19. The pump may be of any desired construction including, for example, a hand-operated pump. The pump should be capable of pressurizing a lubricant to at least about 300 psi. A suitable form of power-driven pump is disclosed in U.S. Pat. No. 4,028,473. A suitable lubricant is disclosed in my U.S. Pat. No. 4,111,820. Of the various lubricants disclosed, it is preferred to employ a lubricant consisting essentially of 3 parts by volume propylene glycol, 1 part by volume polyethylene oxide and 9–40 parts, but usually 25 parts by volume water. Such a lubricant is non-degrading to plastic materials and, therefore, it is especially useful in a cable having sheathing made of polyethylene material. Also, since it is contemplated that many times the remaining sheathing will have new conductors reintroduced, residual lubricant cant must not affect the sheathing materials of the new conductors. Thus, it is to be understood that the sleeve 13 may be threaded onto a cleaned end of a cable where the sheathing is made from materials other than lead. To enhance the attachment of a sleeve onto a sheating made of plastic materials, a film of cured adhesive may be established between the sheathing and the sleeve, or since many times, the undersheath of polyethylene sheathed cables is a tin or lead shield, the poly may be slit and removed, and the fittings attached to these materials. Such an adhesive may be of any suitable type such as epoxy resins or the like.

The lubricant which is selected for use may be of any suitable low-to-high viscosity lubricant. The pressure at which the lubricant is introduced into the cable is dependent to a large extent upon the particular sheathing material of the cable. During the period of time while the lubricant is fed by line 18 through the fitting 15 into the end of the sleeve 13, the opposite end of the cable is monitored for the appearance of lubricant. To facilitate such monitoring, it is preferred to remove a short length of the sheathing to expose the conductors. After the presence of lubricant is observed at the end of a cable which is opposite the location of sleeve 13, the introduction of lubricant is stopped. The lubricant is then allowed to disperse within the sheathing to form a film of lubricant between the sheathing and the conductors. This is typically achieved within one hour's time during which the usual inner wrap of paper within the cable becomes saturated with the lubricant. The conductors are then pulled from the sheathing. Depending upon the length of cable and the severity of deflections from a straight-line course, the conductors may be removed by reestablishing pressurized lubricant within the sleeve 13. In this event, the conductors are removed under the pressure developed by the lubricant acting as a hydraulically-operated pump to develop a sufficient force to displace the conductors from the sheathing. Usually, however, it is preferred to attach a gripping device 20 to the conductors at the exposed end of the cable and apply a suitable tension through a winch or the like. The gripping device, shown in FIG. 1, is a hollow tube made of diagonally-woven strands of fibers.

When the cable is buried, the earth usually provides sufficient anchoring to prevent longitudinal movement of the sheathing while the conductors are removed under tension. In the event an earth anchor is insufficient or the cable is located within an underground conduit or even aboveground, anchoring of the cable is suitably achieved by removing the fitting 17 from the end cap fitting 15. A T-shaped anchor 21, shown in FIG. 2, is conveniently used to anchor the sheathing. The T-shaped anchor has threads along an extended leg 22. These threads mate with the threaded opening in the end wall 16 of the fitting 15. A rope or other suitable means is used to couple the head portion of the anchor to a stationary surface to provide the necessary resistance to longitudinal movement of the sheathing.

In place of the pump 19, the present invention contemplates the use of a pressure tank capable of withstanding at least 300 psi. The tank is coupled by a hose to the end cap fitting 15. After a suitable quantity of lubricant is loaded into the tank, the tank is closed and pressure is developed above the lubricant through the use of a pressurized gas supply such as nitrogen. A regulator valve coupled to the gas supply is used to control the force imposed on the lubricant and thus the propelling force at which the lubricant is fed into the sheathing through sleeve 13. The regulator valve is also used to maintain a constant pressure on the lubricant in the tank.

In the event an open flame is not permitted or acceptable in the environment in which the cable is located, a suitable bonding agent is used between the sleeve 13 and the sheathing 14. A sufficient quantity of a bonding agent is used to fill the voids and to withstand a pressure of at least 300 psi. A two-part epoxy resin which undergoes catalytic curing is useful for this purpose. Such a bonding agent is equally useful with lead sheathing and dense polyethylene sheathing. However, the bonding agent must be cured for a sufficient time to achieve the necessary bonding function or, as previously mentioned, if the subshield is tin or lead, the oversheath may be removed and bonding to the shield may be accomplished.

In the event the entire length of the cable can be inspected before removal of the conductors therefrom, it is preferred to determine the existence of any breaks to the sheathing. Such a determination can be accomplished by visual inspection; however it is preferred to employ two sleeves 13, one attached to each end of the cable as described hereinabove. The fitting at one end of the cable is sealed while the other end is coupled to an air supply having a monitor such as a pressure gauge. Determination is then made as to whether it is possible to establish and maintain a pneumatic pressure within the sheathing. In the event of ruptures or breaks to the sheathing, a lubricant is introduced from both ends to assure the formation of a film of lubricant between the sheathing and the conductors. Withdrawal of the conductors is accomplished by attaching a gripper to the conductors at one end of the cable and an anchor to the sheathing at the other end of the cable.

Although the invention has been shown in connection with a certain specific embodiment, it will be readily apparent to those skilled in the art that various changes in form and arrangement of parts may be made to suit requirements without departing from the spirit and scope of the invention.

I claim:

1. A method for removing conductors from the sheathing of cable comprising the steps of:
    selecting a length of cable having a plurality of conductors extending along a length of sheathing, attaching a sleeve to the outer surface of the sheathing at one end thereof, using the sleeve to introduce a lubricant into the sheathing under sufficient pressure to cause the lubricant to flow from one end of the cable toward an opposite end thereof along the conductors within the sheathing, establishing an effective amount of lubricant between the sheathing and the conductors by dispersion of the lubricant from the conductors, and withdrawing the plurality of conductors in the presence of said effective amount of lubricant from the sheathing by applying a force to one end of the conductors.

2. The method according to claim 1 including the further step of using the sleeve attached to one end of the sheathing to anchor the sheathing against longitudinal movement while withdrawing the conductors therefrom.

3. The method according to claim 2 wherein said step of attaching a sleeve includes threading a selected length of an internally threaded sleeve along the outer surface of the sheathing.

4. The method according to claim 1 including the further step of forming an end surface on the sheathing and conductors perpendicular to the selected length of the cable for attaching said sleeve to the sheathing.

5. The method according to claim 1 including the further step of attaching a fitting to said sleeve to deliver a lubricant thereto for said step of introducing.

6. The method according to claim 1 wherein said step of attaching a sleeve includes cleaning the exterior surface of the sheathing along a selected length at one end thereof and forming a bonding film between the sleeve and the clean exterior surface of the sheathing.

7. The method according to claim 1 wherein said bonding film is solder and wherein said sheathing is lead.

8. The method according to claim 1 wherein said bonding film is cured adhesive and said sheathing is plastic.

9. The method according to claim 1 including the further step of using the sleeve attached to the sheathing to form a threaded connection with an anchor to resist longitudinal movement of the sheathing while withdrawing the conductors therefrom.

10. The method according to claim 1 wherein said step of withdrawing the conductors includes exposing end portions of the conductors and attaching a gripper device to the exposed end portions of the conductors.

* * * * *